(12) United States Patent
Keech

(10) Patent No.: US 7,043,635 B1
(45) Date of Patent: May 9, 2006

(54) EMBEDDED SYNCHRONOUS RANDOM DISPOSABLE CODE IDENTIFICATION METHOD AND SYSTEM

(75) Inventor: Winston Donald Keech, Whitby (GB)

(73) Assignee: Swivel Secure Limited, (GB)

( * ) Notice: Subject to any disclaimer, the term of this patent is extended or adjusted under 35 U.S.C. 154(b) by 902 days.

(21) Appl. No.: 09/663,281

(22) Filed: Sep. 15, 2000

(51) Int. Cl.
*H04L 9/00* (2006.01)
*H04L 1/00* (2006.01)

(52) U.S. Cl. .................. 713/168; 380/249; 380/46

(58) Field of Classification Search ............... 713/184, 713/168; 380/249, 46; 445/410
See application file for complete search history.

(56) References Cited

U.S. PATENT DOCUMENTS

| | | | | |
|---|---|---|---|---|
| 5,131,038 A | * | 7/1992 | Puhl et al. | 340/5.61 |
| 5,196,840 A | * | 3/1993 | Leith et al. | 340/5.26 |
| 5,335,280 A | * | 8/1994 | Vobach | 380/42 |
| 5,343,529 A | | 8/1994 | Goldfine et al. | |
| 5,619,575 A | * | 4/1997 | Koopman et al. | 380/28 |
| 5,649,014 A | * | 7/1997 | Koopman et al. | 380/28 |
| 5,878,415 A | * | 3/1999 | Olds | 707/9 |
| 5,926,764 A | * | 7/1999 | Sarpola et al. | 455/450 |
| 5,974,144 A | * | 10/1999 | Brandman | 380/216 |
| 6,078,908 A | | 6/2000 | Schmitz | |
| 6,119,230 A | * | 9/2000 | Carter | 713/200 |
| 6,128,386 A | * | 10/2000 | Satterfield | 380/28 |
| 6,201,871 B1 | * | 3/2001 | Bostley et al. | 380/249 |
| 6,363,151 B1 | * | 3/2002 | Linder | 380/247 |
| 6,704,789 B1 | * | 3/2004 | Ala-Laurila et al. | 709/230 |

FOREIGN PATENT DOCUMENTS

EP 0532231 A2 3/1993

(Continued)

OTHER PUBLICATIONS

Bruce Schnneier, Applied Cryptography, CP 1996, Katherine Schowalter, Second Edition, p. 10-11.*

(Continued)

*Primary Examiner*—Hosuk Song
*Assistant Examiner*—Linh LD Son
(74) *Attorney, Agent, or Firm*—Greenberg Traurig, LLP; Richard E. Kurtz, II; James E. Goepel

(57) ABSTRACT

A method and system for secure identification of a person in an electronic communications environment, wherein a host computer is adapted to be able to communicate with a specific electronic communications device operated by the person. The person is issued with a mask code, known only to the person and stored in the host computer, but never transmitted electronically there between. When the person is required to identify him- or herself to the host computer, the host computer transmits a pseudo-random string to the specific electronic communications device, whereupon the mask code must be applied to the pseudo-random string according to predetermined rules so as to generate a volatile identification code which is then transmitted back to the host computer. Positive identification is achieved when the volatile identification code matches a volatile identification code generated within the host computer by applying the mask code stored therein to the pseudo-random string. In this way, a person's mask code is never transmitted electronically and is therefore relatively safe from interception, and the volatile identification code will be different for each different pseudo-random string, thus making a fraudulently intercepted communication meaningless.

23 Claims, 1 Drawing Sheet

FOREIGN PATENT DOCUMENTS

| | | |
|---|---|---|
| EP | 0817518 A2 | 1/1998 |
| GB | 2279541 A | 1/1995 |
| JP | 63-310257 | 12/1988 |
| JP | 11-306141 | 11/1999 |
| WO | WO 95/19593 | 7/1995 |
| WO | WO 96/00485 | 1/1996 |

OTHER PUBLICATIONS http://www.trincoll.edu/depts/cpsc/cryptography/caesar.html.*
Cardano Grilles, 16th Centuries, http://educ.queensu.ca/~fmc/may2004/cardano.html.*

* cited by examiner

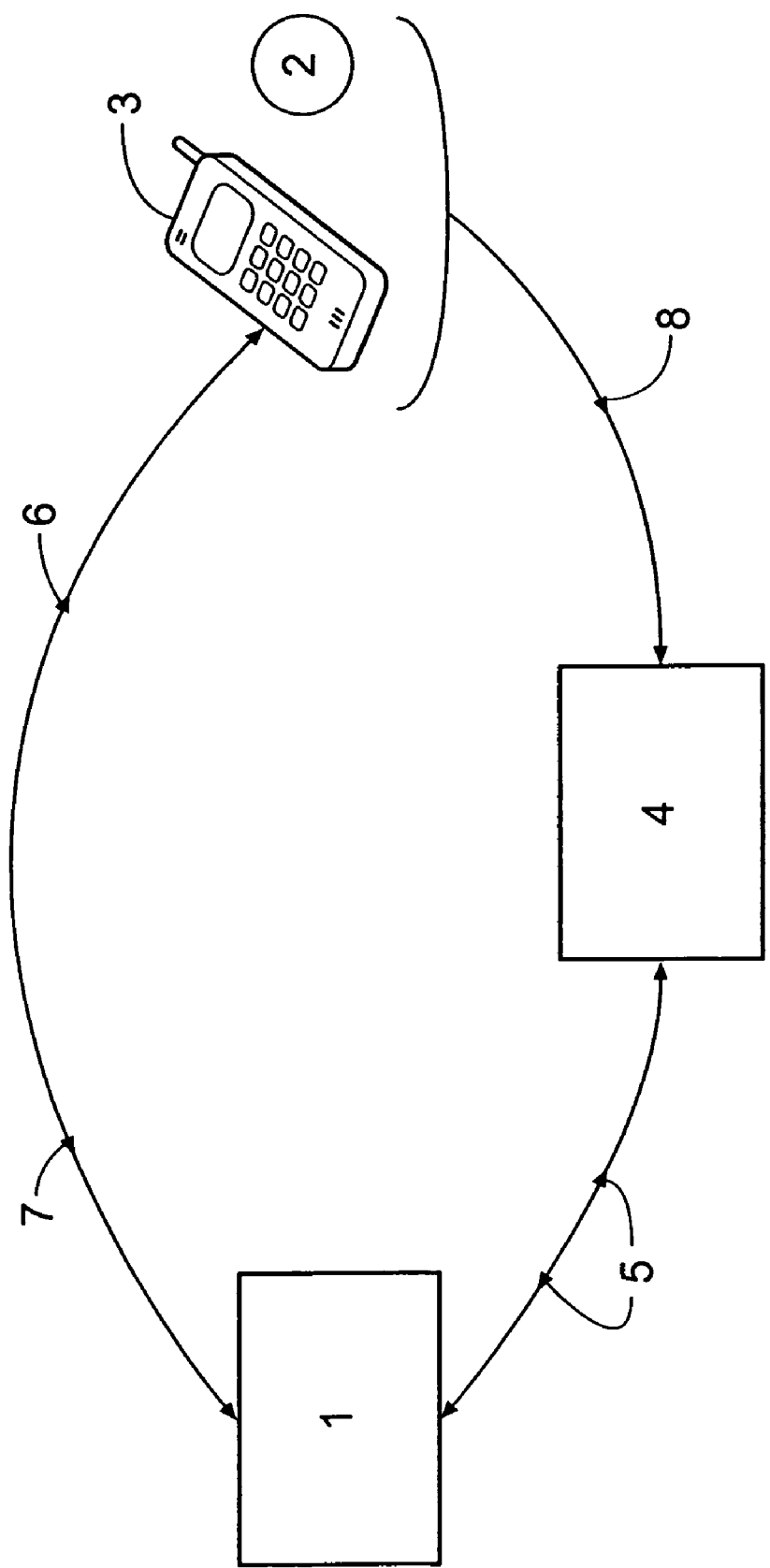

EMBEDDED SYNCHRONOUS RANDOM DISPOSABLE CODE IDENTIFICATION METHOD AND SYSTEM

CROSS-REFERENCE TO RELATED APPLICATIONS

Priority of U.K. Patent Application No. GB 0021964.2, filed 7 Sep. 2000, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a system and method for identifying a user or device and, optionally, for conducting transactions between the user or device and a third party, for example by way of a telephone connection or an electronic computer system such as the Internet.

2. General Background of the Invention

Various systems are known for conducting electronic transactions in a more or less secure manner over a telecommunications link or the like. One well known system is known as electronic funds transfer at point-of-sale (EFT-POS), in which a user is issued with a credit or debit card bearing a unique identification number, usually embossed on the card in human-readable form and also encoded on a machine-readable magnetic strip on the reverse of the card. For further identification purposes, the card typically includes space for a user permanently to include his or her signature. In use, when a user wishes to make a purchase in, for example, a retail store, he or she presents the debit or credit card to a store employee. The card is then swiped through a card reader, and information relating to the identity of the card, the identity of the retail store and the value of the goods or services being purchased is transmitted by way of a telephone connection to a remote computer server operated by the card issuer (normally a bank or suchlike). The remote computer server checks that the user's card account contains sufficient funds or credit to cover the proposed transaction, checks that the user's card account is currently operational (for example, to check that the card has not been reported stolen), and then issues a confirmation signal back to the card reader to indicate that the transaction may be authorised. The store employee must then obtain a specimen of the user's signature and compare this with the signature on the reverse of the card so as to check the identity of the user. If the signatures appear to match, the store employee operates the card reader to complete the transaction, and the funds required to cover the transaction are then electronically transferred from the user's card account to the retail store. If the signatures do not appear to match, then the store employee may request additional proof of identification before authorizing the transaction, or may simply refuse the transaction and retain the user's card, which may have been stolen, thereby preventing any unauthorized transfer of funds. This system is open to fraudulent abuse, since it is possible for a card to be stolen and for a thief to forge the signature of an authorised user.

In a development of this system, a card user may be issued with a personal identification number (PIN), which is usually a four digit code, and which is theoretically known only to the user and to the card issuer. Instead of or in addition to providing a specimen of his or her signature at the point-of-sale, the card user is required to enter his or her PIN into the card reader, and this information is transmitted to the remote computer server together with the card and retail store identification data and data regarding the value of the transaction. By providing an extra identification check by way of the PIN, this system helps to prevent fraud by forgery of signatures, but is still not completely secure because the PIN does not change between transactions, and may therefore be intercepted together with card identification data when being transmitted between the card reader and the remote server. Furthermore, it is possible for a thief to observe a user entering his or her PIN into a card reader and to remember the PIN. If the thief is also able to obtain card identification details, for example from a discarded till receipt or through conspiracy with the store employee, it is a simple matter to produce a fake card including all the appropriate identification information for later fraudulent use, or even to rob the authorised card user of his or her card.

BRIEF SUMMARY OF THE INVENTION

According to a first aspect of the present invention, there is provided a coded identification system, the system comprising an electronic computer, a specific electronic communications device that is operable to be in communication with the electronic computer, and at least one electronic communications device that is operable to be communication with the electronic computer, wherein the electronic computer includes data relating to the specific electronic communications device, including a permanent identification code, a mask code and an identification code enabling electronic communication between the electronic computer and the specific electronic communications device, and wherein the permanent identification code is input to the at least one electronic communications device and transmitted to the electronic computer, the electronic computer generates a pseudo-random string and transmits this to the specific electronic communications device, the mask code is applied to the pseudo-random string so as to generate a volatile identification code in accordance with predetermined rules, the volatile identification code is transmitted back to the electronic computer by the specific electronic communications device or the at least one electronic communications device, the electronic computer checks the volatile identification code transmitted thereto against a volatile identification code obtained by applying the mask code to the pseudo-random string in accordance with the predetermined rules, and in which a positive identification is made when the volatile identification codes are found to match by the electronic computer.

According to a second aspect of the present invention, there is provided a method for identifying a specific electronic communications device or user thereof to an electronic computer having stored therein data relating to the specific electronic communications device or user thereof, including a permanent identification code, a mask code and an identification code enabling communication between the electronic computer and the specific electronic communications device, wherein the permanent identification code is input to at least one electronic communications device and transmitted thereby to the electronic computer, the electronic computer associates the permanent identification code with the identification code enabling communication there between and the specific electronic communications device and generates a pseudo-random string before transmitting this to the specific electronic communications device, the mask code is applied to the pseudo-random string in accordance with predetermined rules so as to generate a volatile identification code, the volatile identification code is input to the specific electronic communications device or the at least one electronic communications device and transmitted to the electronic computer where it is compared with a volatile identification code generated therein by applying the mask code to the pseudo-random string, and a positive identification is made when the volatile identification codes match.

The specific electronic communications device may be a separate device from the at least one electronic communications device, or may be the same device. For example, the specific electronic communications device may be a mobile telephone, a pager, a land-line telephone, a personal digital assistant or a computer which may be owned or specifically operated by a given person. The at least one electronic communications device may be an electronic funds transfer (EFT) or electronic finds transfer at point-of-sale (EFTPOS) terminal, or may be the same mobile telephone, pager, land-line telephone, personal digital assistant or computer which may be owned or specifically operated by the person as hereinbefore described.

The permanent identification code may be supplied to a user in the form of a card bearing human- and/or machine-readable data.

The identification code enabling electronic communication between the electronic computer and the specific electronic communications device may be a mobile telephone or pager number where the specific electronic communications device is a mobile telephone, pager or personal digital assistant, or may be an e-mail address or any similar code allowing specific communication with a given specific electronic communications device.

Where the specific electronic communications device is a mobile telephone or the like, the pseudo-random string may be transmitted in the form of a textmessage under the short messaging service (SMS) protocol. Other well-known communications protocols may be employed where appropriate, depending on the nature of the specific electronic communications device.

Embodiments of the present invention provide additional security of identification in a number of ways. Firstly, in addition to requiring the person to have access to the permanent identification code, the system requires the person to be in possession of an appropriate specific electronic communications device. Secondly, because the system requires the user to cause his or her mask code to operate on the pseudo-random string so as to generate a volatile identification code in accordance with the predetermined rules, without the mask code being electronically transmitted together with the permanent identification code, it is difficult for an unauthorised person to intercept communications between the electronic computer, the specific electronic communications device and/or the at least one electronic communications device so as to determine the mask code and the permanent identification code.

It will be appreciated that the present invention extends to situations where it is required to establish a secure identification of a specific electronic communications device rather than of a person as such. For example, the present invention may be used as part of a secure "hand-shaking" protocol between remote computers, serving positively and securely to identify the specific electronic communications device, which may itself be an electronic computer, to the electronic computer. Both the electronic computer and the specific electronic communications device will have the mask code stored within their memories but will not communicate the mask code between each other except by way of a secure connection, ideally entirely separate from their normal means of communication.

The mask code may take various forms. In a currently preferred embodiment, a person is issued with or selects a four digit numerical string, for example 3928, analogous to the well-known PIN codes currently used when operating automated teller machines (ATMs). However, different lengths of mask code may be used as appropriate. The pseudo-random string (which may be numeric, alphanumeric or any other combination of characters) transmitted to the specific electronic communications device in response to a signal sent by the at least one electronic communications device is displayable thereon in a predetermined form, with the characters making up the pseudo-random string being displayed preferably as a linear array. The person operating the specific electronic communications device then takes the first digit of his or her mask code, in this example 3, and notes the character in third position (say from left to right) along the pseudo-random string. The person then takes the second digit of his or her mask code, in this example 9, and notes the character in ninth position along the pseudo-random string, and so on for the digits 2 and 8 of the mask code. The characters selected from the pseudo-random string form the volatile identification code which is then input into the at least one electronic communications device and transmitted to the electronic computer for verification. Alternatively, the volatile identification code may be transmitted to the electronic computer by way of the specific electronic communication device. If the volatile identification code received by the electronic computer corresponds to an expected volatile identification code calculated by the electronic computer applying the mask code to the pseudo-random string, a positive identification is taken to have been made. The prime security feature is that the mask code is never transmitted between the electronic computer, the specific electronic communications device or the at least one electronic communications device, and is thus safe from interception by unauthorised third parties. The secondary security feature is that a person must be in possession of his or her own specific electronic communications device, since the electronic computer will transmit the pseudo-random string only thereto.

For additional security, after the volatile identification code has been transmitted to the electronic computer for verification and found to match a volatile identification code generated by the electronic computer, the electronic computer may transmit a message to the specific electronic communications device requesting that the person confirms that the identification is correct. Only when the person responds affirmatively to the message by transmitting a confirmatory message from the specific electronic communications device to the electronic computer is the identification process finally completed.

In some embodiments of the present invention, it is not necessary for a person operating the specific electronic communications device to view the pseudo-random string and to apply the mask code manually thereto. Instead, a computer program may be provided in a memory of the specific electronic communications device which allows the person to enter his or her mask code when prompted, and which then applies the mask code automatically to the pseudo-random string, returning the appropriate volatile identification code for input into the specific electronic communications device or the at least one electronic communications device.

In a further development, at least one position in the pseudo-random string may be chosen to contain a character representative of a predetermined parameter or condition. Advantageously, the position of the character and its representational meaning are known only to the electronic computer and the person operating the specific electronic communications device. For example, where the electronic computer is operated by a bank and the permanent identification code is the person's bank account number, then one of the positions in the pseudo-random string, say the seventh, may be chosen to be representative of a balance of the person's bank account, with 0 for example indicating zero funds and 9 indicating a balance of over 1000, with figures 1 to 8 being representative of balances there between on a linear scale. Alternatively, for greater security, the at least one position in the pseudo-random string may be chosen to contain a flag character, with say any one of the digits 1 to 5 indicating a balance below £500 and any one of the digits 6 to 9 indicating a balance above £500. It will be apparent that many other representational schemas may be applied so as to convey information in the pseudo-random string. Because the position and meaning of the at least one representative character in the pseudo-random string is preferably selectable by the person rather than following a set format which may become known to unauthorised third parties, it remains difficult to extract meaningful information should the pseudo-random string be intercepted during transmission. Furthermore, the person may be required to identify the position and/or meaning of the at least one representative character after receiving the pseudo-random string, thereby providing an additional layer of security in the identification process.

It will be apparent that in the embodiment described hereinabove, the pseudo-random string must be at least ten characters long, since a mask code made up of the numbers 0 to 9 requires at least ten positions along the pseudo-random string to be functional. However, a person of ordinary skill will appreciate that different mask codes and string lengths may be used as required by selecting appropriate coding schemas. It is to be emphasised that the pseudo-random string issued by the electronic computer in response to an identification request from the at least one electronic communications device will be different for each request, and that it will therefore be extremely difficult to determine a given mask code given a series of potentially interceptable pseudo-random strings and volatile identification codes. Indeed, in embodiments where the specific electronic communications device is a separate device from the at least one electronic communications device, for example a mobile telephone and an EFTPOS terminal respectively, then the pseudo-random string and the volatile identification code are never transmitted along the same route, for example a given temporary telephone connection. In embodiments where the specific electronic communications device is the same device as the at least one electronic communications device, for example a remote computer terminal adapted for secure connection to the electronic computer, then the pseudo-random string may be transmitted along the same route, but not together at the same time. In the latter embodiment, an initial request to log on to the electronic computer may only be considered if it emanates by way of a direct modem link from a predetermined telephone number associated with the person, the pseudo-random string is then transmitted back along the modem link to the remote terminal and the volatile identification code transmitted to the electronic computer by way of the same direct modem connection.

In a particularly preferred embodiment, the electronic computer is operated by a debit or credit card issuer, the specific electronic communications device is a mobile telephone, the at least one electronic communications device is an EFTPOS terminal operated by a retailer, the permanent identification code is a person's debit or credit card account number, the mask code is a four digit number as described above, the identification code enabling electronic communication between the electronic computer and the specific electronic communications device is a telephone number of the mobile telephone. It is to be understood that the debit or credit card issuer may be a bank which issues standard debit cards enabling purchases to be made against funds in the person's current account or standard credit cards enabling purchases to be made against a credit account, or may alternatively be a specialist service provider issuing dedicated debit cards to subscribers, where the subscribers must arrange for funds to be transferred to the service provider as required so as to keep at least a minimum positive balance associated with their dedicated debit card accounts.

When a person first applies for an account from the card issuer, he or she is issued with an account number and a card which bears the account number and name of the account holder in the usual way, for example by way of embossing the card with human-readable indicia and by way of providing machine-readable data on a magnetic strip on a reverse portion of the card. The person must supply the usual details, such as name and home address, to the card issuer, together with his or her mobile telephone number. It is also necessary for the mask code to be issued by the card issuer or to be agreed between the card issuer and the person. The mask code is preferably issued separately from the card, for example by way of separate postal deliveries, and is never transmitted together with the account number and/or telephone number. When the person wishes to make a purchase using the debit or credit card, he or she presents the card to a retailer. The retailer than swipes the card through the EFTPOS terminal, which then contacts a main computer operated by the card issuer. The card/account number is transmitted to the main computer by way of a modem link, together with transaction details including the price of the purchase being made. The main computer then correlates the card/account number with the person's mobile telephone number and, if there are sufficient funds in the account to cover the intended purchase, generates a pseudo-random string which is transmitted to the mobile telephone by way, for example, of an SMS message over a cellular telecommunications link. The person applies the mask code to the pseudo-random string as hereinbefore described, and then gives the volatile identification code thus generated to the retailer. The retailer, in turn, enters the volatile identification code into the EFTPOS terminal, which then transmits this data back to the main computer where it is correlated with the person's account details and compared with a volatile identification code temporarily stored in the main computer and generated therein by applying the mask code to the pseudo-random string independently of the person. If the volatile identification codes match, the main computer transmits a confirmation message to the EFTPOS terminal authorising the transaction, and the necessary funds to cover the purchase are then transferred automatically to the retailer and debited from the person's card account.

In the event that there are insufficient funds in the person's account to cover the cost of the purchase, the main computer may issue a signal to the EFT terminal that the transaction is not authorised, and may issue a message to the mobile telephone advising the person to add funds to the account. In the event that the volatile identification codes are found not to match, then the main computer may issue a signal to the EFTPOS terminal so as to inform the retailer, who may then ask the person to check that the correct volatile identification code has been generated and to provide the correct code for transmission to the main computer. If the person gives the wrong volatile code more than a predetermined number of times, for example three times, then the main computer may suspend that person's account temporarily for reasons of suspicion of fraudulent use. The authentic card holder must then apply to the card issuer, together with suitable verification of his or her identity, before the account is reactivated and/or a new account and card is issued.

In some embodiments, the person may communicate with the central computer directly by way of his or her mobile telephone. This is possible because transmissions from a mobile telephone include details of the number of telephone number of the mobile telephone, and because the main computer is able to correlate mobile telephone numbers with card accounts. One useful feature that may be provided is an emergency account lock that may be activated in the event that the credit or debit card or even the mobile telephone is stolen. Such a lock may be activated by transmitting a predetermined lock code, for example 9999, to the main computer. Alternatively or in addition, a lock code may be issued in mask code format, which is useful in the event that a person is robbed and threatened with violence so as to hand over his or her card and mobile telephone, together with his or her mask code.

A further useful security feature may be provided wherein, after the volatile identification code has been transmitted to the electronic computer for verification and found to match a volatile identification code generated by the electronic computer, the electronic computer may transmit a message to the mobile telephone requesting that the person confirms that the transaction is authorised. The message may be sent in SMS or voicemail format, and may include details of the transaction. Only when the person responds affirmatively to the message by transmitting a confirmatory message from the mobile telephone to the electronic computer is the transaction finally authorised.

The credit or debit card of this embodiment of the present invention may also be used to make secure purchases over the Internet. In this scenario, the at least one electronic communications device may be a computer server operated by an Internet retailer. When a person wishes to make a secure purchase, he or she submits the account number to the server, by way of e-mail or through the retailer's website, and the server then transmits the account details and purchase details to the main computer operated by the card issuer as before. An SMS message containing the pseudo-random string is then transmitted to the person's mobile telephone, and the person then causes a volatile identification code to be generated and then submitted to the retailer's server from where it is transmitted to the main computer for verification before the transaction is authorised and funds released.

A person may have more than one account with the card issuer, and may accordingly select or be assigned more than one mask code, one for each account. Alternatively or in addition, more than one mask code may be assigned to each account, and the main computer may indicate by way of one or more characters in the pseudo-random string that it is expecting the person to apply a particular mask code, selected from a plurality of prearranged mask codes, to the pseudo-random string, thus providing an additional level of security.

It is to be appreciated that the present invention is not limited to credit or debit card transactions, but provides a secure method and system of identification in a wide variety of situations. For example, access to a building or vehicle may be controlled by providing a central computer holding details of all people authorised to enter the building or vehicle, and a swipe card bearing a unique identification number or code in magnetically-coded format may be issued to each person authorised to enter the building or vehicle. At entrances to the building or vehicle, electronic locks linked to card scanners and electronic keypads may be provided, the card scanners and keypads allowing communication with the central computer. When an authorised person wishes to enter the building or vehicle, he or she swipes the swipe card through the card scanner, which then transmits the unique identification number or code to the central computer. The central computer correlates the unique identification number or code with personal details of the person, including a predetermined mask code, and then transmits a pseudo-random string to the keypad for display on a display provided thereon. The person must then apply his or her mask code to the pseudo-random string and enter the volatile identification code thus generated into the keypad, which then transmits the volatile identification code to the central computer for comparison with a volatile identification code generated in the central computer as hereinbefore described. If the volatile identification codes match, then the central computer issues a signal to unlock the electronic lock. Such a system provides a significant advantage over existing electronic locks operated by keying in a predetermined code, because each time a person enters the building or vehicle, he or she will have to enter a different volatile identification code. This means that a potential thief or the like will not be able to gain access to the building or vehicle merely by observing an authorised person keying in an entry code and subsequently entering the same entry code.

Furthermore, it is not necessary to provide a swipe card to each person authorised to enter the building or vehicle. Instead, each person is issued with a unique and memorable permanent identification number or code, which may be input by way of the electronic keypad when access to the building or vehicle is required. The unique permanent identification number or code is then correlated in the central computer with the appropriate mask code and a pseudo-random string transmitted to the electronic keypad for display on a display thereof as before.

It will be appreciated that in the above embodiments, the electronic keypad and optional card scanner form the at least one electronic communications device as well as the specific electronic communications device. For added security, albeit involving additional inconvenience, persons authorised to enter the building or vehicle may be provided with mobile telephones as specific electronic communications devices, with the pseudo-random string being transmitted to the mobile telephone rather than to a display on the electronic keypad.

Alternative uses for the system and method of the present invention include any situation where secure identification of a person in an electronic communications environment is required. For example, the system and method maybe employed for secure remote log-in to a computer and secure telecommunications in general (e.g. business-to-business e-commerce transactions, air traffic control communications etc.). The system and method may also be implemented in the context of a vehicle immobiliser and/or alarm, whereby an authorised user of the vehicle is requested to apply a mask code to a pseudo-random string so as to deactivate the immobiliser or alarm.

A further use for the present invention is as a secure ticketing system. A supplier of travel tickets, concert tickets, cinema and theatre tickets and tickets for sporting events, among others, may issue a "virtual" ticket in the form of a permanent customer identification code and a pseudo-random string transmitted from a host computer to a specific electronic communications device. Upon arrival at a venue or upon request by a ticket inspector, a person to whom the "virtual" ticket has been issued may be required to apply his or her mask code to the pseudo-random string and to provide the virtual identification code generated thereby, together with the permanent customer identification code, to the ticket inspector. The ticket inspector may be provided with an electronic communications device by way of which this information may be transmitted back to the host computer for verification, and to which a verification signal may be sent by the host computer in the event that the person is positively identified as an authorised ticket holder.

Yet another use for the present invention is in a parcel or postal depot, such as a post office, or a catalogue store or a warehouse or the like, where people visit to pick up parcels, post or other articles and it is necessary positively to identify a person before handing over the parcels, post or other articles. A person picking up an article will have been issued with a pseudo-random string and, upon collection, is asked to supply a volatile identification code generated by the application of his or her mask code to the pseudo-random string.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a schematic diagram showing a preferred embodiment of the present invention.

DETAILED DESCRIPTION OF THE INVENTION

FIG. 1 shows a host computer 1 operated by a credit/debit card issuer, a user 2 having a mobile telephone 3, and an EFTPOS terminal 4. The user 2 is issued with a card (not shown) having a unique 16-digit account number embossed and magnetically encoded thereon, this 16-digit account number being correlated in the host computer 1 with account details relating to the user as well as a 4-digit mask code selected by or assigned to the user 2 upon initial registration with the credit/debit card issuer and a unique telephone number of the mobile telephone 3. The 16-digit account number is chosen for compatibility with existing credit/debit card protocols, and the 4-digit mask code for compatibility with existing PIN protocols. When the user 2 wishes to make a purchase from a retailer (not shown) operating the EFTPOS terminal 4, he or she presents the card, which is then scanned by the EFTPOS terminal 4. Details regarding a purchase are also entered into the EFTPOS terminal 4 by the retailer, and these are transmitted, together with the account number, to the host computer 1 by way of a modem link 5. The host computer 1 then correlates the account number with details of the user 2, including the telephone number of the mobile telephone 3, and generates a 13-digit pseudo-random string which is transmitted to the mobile telephone 3 by way of an SMS or voicemail protocol 6. The first three digits of the pseudo-random string are not random and are reserved to indicate to the user that a received SMS message is from the host computer. For example, the first three digits may be "T1:" or "T2:" or the like, so as to indicate that the host computer 1 is expecting the user 2 to apply a first or a second mask code to the pseudo-random string. The next 10 digits of the pseudo-random string provide sufficient redundancy for any 4-digit mask code to operate thereupon in the manner hereinbefore described. By choosing a string length of 13 digits for the pseudo-random string, compatibility with existing mobile telephone displays and EAN13 (European Article Number) barcode protocols is ensured.

Upon reception of the pseudo-random string by the mobile telephone 3, the user 2 must apply the mask code thereto as hereinbefore described so as to generate a volatile identification code, which is then passed 8 to the retailer and entered into the EFTPOS terminal 4 for transmission to the host computer 1. Alternatively, the volatile identification code may be returned by the user 2 to the host computer 1 by way of the mobile telephone 3. When the host computer 1 receives the volatile identification code, it compares this with a volatile identification code generated within the host computer 1 by applying the mask code to the pseudo-random string and, if the volatile identification codes are found to match, issues a signal to the EFTPOS terminal 4 so as to authorize the purchase and to transfer necessary funds to the retailer. Optionally, before authorizing the transfer of funds, the host computer 1 may send a message to the mobile telephone 3, for example in SMS or voicemail format 6, preferably including details of the transaction, and requesting that the user 2 return a signal 7 so as finally to confirm the transaction. This may provide added peace-of-mind for unusually large transactions and may alert a user 2 in the event that fraudulent use is being made of his or her card.

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A coded identification system, the system comprising an electronic computer, a specific electronic communications device that is operable to be in communication with the electronic computer, and at least one electronic communications device that is operable to be in communication with the electronic computer, wherein the electronic computer includes data relating to the specific electronic communications device, including a permanent identification code, a mask code and an identification code enabling electronic communication between the electronic computer and the specific electronic communications device, and wherein the permanent identification code is input to the at least one electronic communications device and transmitted to the electronic computer, the electronic computer generates a pseudo-random string and transmits this to the specific electronic communications device, the mask code is applied to the pseudo-random string so as to generate a volatile identification code in accordance with predetermined rules, the volatile identification code is transmitted back to the electronic computer by the specific electronic communications device or the at least one electronic communications device, the electronic computer checks the volatile identification code transmitted thereto against a volatile identification code obtained by applying the mask code to the pseudo-random string in accordance with the predetermined rules, and in which a positive identification is made when the volatile identification codes are found to match by the electronic computer, wherein the pseudo-random string comprises a first array of characters; each character having a given numerical position in the first array (first, second, third etc.), and wherein the mask code comprises a second array of numbers, each number having a given numerical position in the second array (first, second, third etc.), the predetermined rules for applying the mask code to the pseudo-random string so as to generate the volatile identification code being sequentially to select numerical positions in the first array on the basis of the numbers in the second array, taken in positional order, and to return the characters thereby selected from the first array in sequence so as to form a third array, this third array forming the volatile identification code.

2. A system as claimed in claim 1, wherein the specific electronic communications device and the at least one electronic communications device are the same device.

3. A system as claimed in claim 1, wherein the specific electronic communications device and the at least one electronic communications device are separate devices.

4. A system as claimed in claim 1, wherein the specific communications device is a mobile telephone, a pager or a personal digital assistant.

5. A system as claimed in claim 3, wherein the it least one electronic communications device is an EFTPOS terminal or the like.

6. A system as claimed in claim 1, wherein the permanent identification code is supplied in the form of a card bearing human- and/or machine-readable indicia.

7. A method for identifying a specific electronic communications device or user thereof to an electronic computer having stored therein data relating to the specific electronic communications device or user thereof, including a permanent identification code, a mask code and an identification code enabling communication between the electronic computer and the specific electronic communications device, wherein the permanent identification code is input to at least one electronic communications device and transmitted thereby to the electronic computer, the electronic computer associates the permanent identification code with the identification code enabling communication there between and the specific electronic communications device and generates a pseudo-random string before transmitting this to the specific electronic communications device, the mask code is applied to the pseudo-random string in accordance with predetermined rules so as to generate a volatile identification code, the volatile identification code is input to the specific electronic communications device or the at least one electronic communications device and transmitted to the electronic computer wherein it is compared with a volatile identification code generated therein by applying the mask code to the pseudo-random string, and a positive identification is made when the volatile identification codes match, wherein the pseudo-random string contains at least one character that is representative of some condition of the data relating to the person.

8. A method for identifying a specific electronic communications device or user thereof to an electronic computer having stored therein data relating to the specific electronic communications device or user thereof, including a permanent identification code, a mask code and an identification code enabling communication between the electronic computer and the specific electronic communications device, wherein the permanent identification code is input to at least one electronic communications device and transmitted thereby to the electronic computer, the electronic computer associates the permanent identification code with the identification code enabling communication there between and the specific electronic communications device and generates a pseudo-random string before transmitting this to the specific electronic communication device, the mask code is applied to the pseudo-random string in accordance with predetermined rules so as to generate a volatile identification code, the volatile identification code is input to the specific electronic communications device or the at least one electronic communications device and transmitted to the electronic computer where it is compared with a volatile identification code generated therein by applying the mask code to the pseudo-random string, and a positive identification is made when the volatile identification codes match, wherein the pseudo-random string comprises a first array of characters, each character having a given numerical position in the first array (first, second, third etc.), and wherein the mask code comprises a second array of numbers, each number having a given numerical position in the second array (first, second, third etc.), the predetermined rules for applying the mask code to the pseudo-random string so as to generate the volatile identification code being sequentially to select numerical positions in the first array on the basis of the numbers in the second array, taken in positional order, and to return the characters thereby selected from the first array in sequence so as to form a third array, this third array forming the volatile identification code.

9. A method according to claim 8, wherein the pseudo-random string contains at least one character that is representative of some condition of the data relating to the person.

10. A method according to claim 7, wherein the specific electronic communications device and the at least one electronic communications device are the same device.

11. A method according to claim 7, wherein the specific electronic communications device and the at least one electronic communications device are separate devices.

12. A method according to claim 10, wherein the specific communications device is a mobile telephone, a pager or a personal digital assistant.

13. A method according to claim 11, wherein the at least one electronic communications device is an EFTPOS terminal or the like.

14. A method according to claim 8, wherein the specific electronic communications device and the at least one electronic communications device are the same device.

15. A method according to claim 8, wherein the specific electronic communications device and the at least one electronic communications device are separate devices.

16. A method according to claim 15, wherein the specific communications device is a mobile telephone, a pager or a personal digital assistant.

17. A method according to claim 16, wherein the at least one electronic communications device is an EFTPOS terminal or the like.

18. A coded identification system, the system comprising an electronic computer, a specific electronic communications device that is operable to be in communication with the electronic computer, and at least one electronic communications device that is operable to be communication with the electronic computer, wherein the electronic computer includes data relating to the specific electronic communications device, including a permanent identification codes, a mask code and an identification code enabling electronic communication between the electronic computer and the specific electronic communications device, and wherein the permanent identification code is input to the at least one electronic communications device and transmitted to the electronic computer, the electronic computer generates a pseudo-random string and transmits this to the specific electronic communications device, the mask code is applied to the pseudo-random string so as to generate a volatile identification code in accordance with predetermined rules, the volatile identification code is transmitted back to the electronic computer by the specific electronic communications device or the at least one electronic communications device, the electronic computer checks the volatile identification code transmitted hereto against a volatile identification code obtained by applying the mask code to the pseudo-random string in accordance with the predetermined rules, and in which a positive identification is made when the volatile identification codes are found to match by the electronic computer, wherein the pseudo-random string contains at lest one character that is representative of some condition of the data relating to the person.

19. A system according to claim 1, wherein the pseudorandom string contains at least one character that is representative of some condition of the data relating to the person.

20. A method according to claim 7, wherein the user is able to first identify to the host the position of the representative character in the pseudorandom string, and secondly identify to the host the meaning of the representative character in the pseudorandom string.

21. A system according to claim 7, wherein the user is able to first identify to the host the position of the representative character in the pseudorandom string, and secondly identify to the host the meaning of the representative character in the pseudorandom string.

22. A method according to claim 18, wherein the user is able to first identify to the host the position of the representative character in the pseudorandom string, and secondly identify to the host the meaning of the representative character in the pseudorandom string.

23. A system according to claim 18, wherein the user is able to first identify to the host the position of the representative character in the pseudorandom string, and secondly identify to the host the meaning of the representative character in the pseudorandom string.

* * * * *